United States Patent

Higgins

[15] 3,644,966
[45] Feb. 29, 1972

[54] LINE CLAMP
[72] Inventor: Edward Ted Higgins, Saginaw, Mich.
[73] Assignee: Line and Rope Clamp, Inc., St. Charles, Mich.
[22] Filed: Mar. 19, 1970
[21] Appl. No.: 21,064

Related U.S. Application Data

[63] Continuation-in-part of Ser. No. 819,754, Apr. 28, 1969, abandoned.

[52] U.S. Cl. .................................... 24/134 QA, 24/132 HL
[51] Int. Cl. ............................................................ F16g 11/00
[58] Field of Search ........ 24/132 HL, 134 QA, 134 P, 134 Q, 24/134 KB, 134 M; 339/274; 287/79

[56] References Cited

UNITED STATES PATENTS

| | | | |
|---|---|---|---|
| 297,509 | 4/1884 | Doremus | 24/134 |
| 895,590 | 8/1908 | Sprague | 24/18 X |
| 1,068,139 | 7/1913 | Johnson | 24/115 G |
| 2,590,886 | 4/1952 | Pedersen | 339/274 X |
| 2,620,534 | 12/1952 | Berger | 24/134 Q |
| 3,467,046 | 9/1969 | Welton | 24/230 AU |

*Primary Examiner*—Bernard A. Gelak
*Attorney*—Clarence A. O'Brien and Harvey B. Jacobson

[57] ABSTRACT

A line clamp for use when called upon to manually bend and form an adjustable nooselike eye at an end portion of a bendable boat tying line, a tent staking or stay rope, a tarpaulin holddown rope, clothesline or the like. It comprises a blocklike body provided with open-ended spaced parallel first and second holes for passage of first and second loop-forming portions of the associated line. A median portion of the body has a third hole providing a passage for a clamping pin for oriented space parallel portions of the line. This pin has readily accessible manually actuatable handling and latching means.

10 Claims, 7 Drawing Figures

Patented Feb. 29, 1972
3,644,966
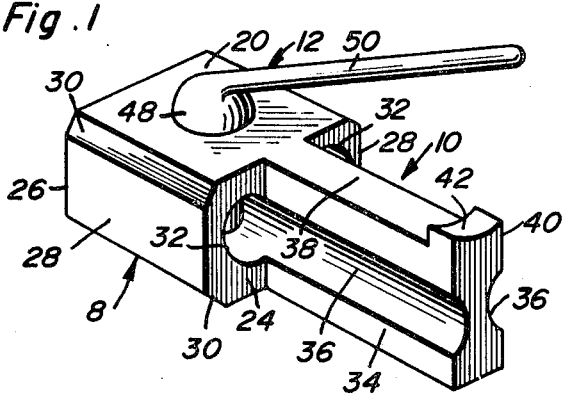
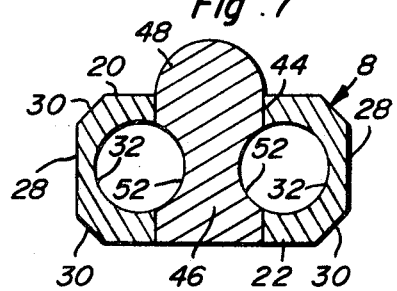
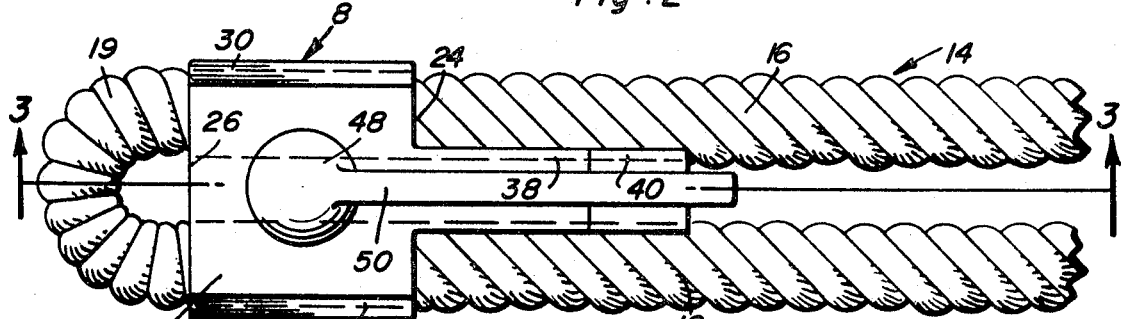
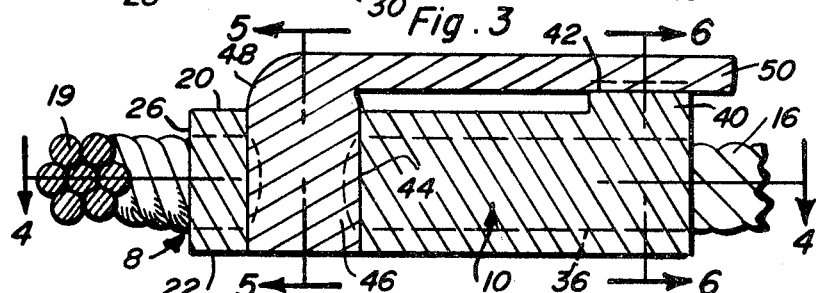
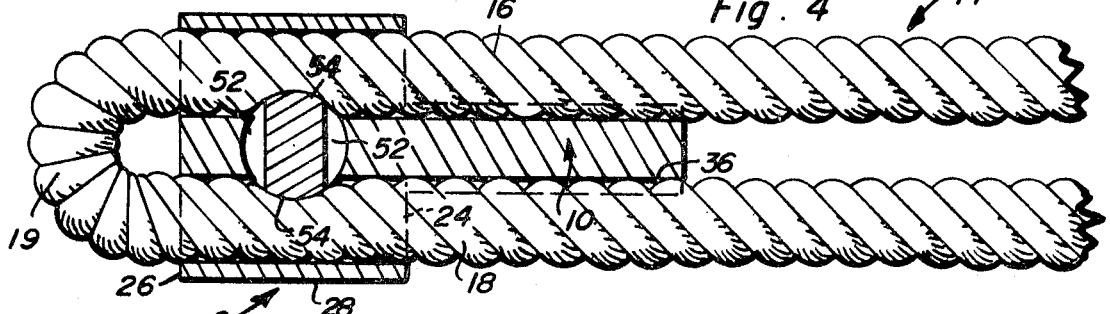
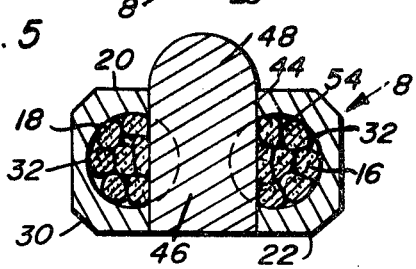
Edward Ted Higgins
INVENTOR.
BY Clarence A. O'Brien
and Harvey B. Jacobson
Attorneys

LINE CLAMP

This application is a continuation-in-part of Ser. No. 819,754, filed on Apr. 28, 1969 and now abandoned.

This invention relates to a holder for a line, cable, or rope and pertains, more particularly, to a one-piece blocklike body having several open-ended bores therein, two of which are coplanar and disposed in spaced parallel relationship to permit passage of coacting portions of the bendable part of the line or rope, an intervening third hole which serves to accommodate an insertable and removable line binding and clamping pin which is equipped with novel pin switching and handling means.

An object of the invention, broadly stated, is to improve upon loop and eye forming rope holders and clamps, and, in so doing, to provide a simple, practical and easy-to-use line bending and binding clamp which, as practical experience has shown, well serves the purposes for which it has been devised and effectually used.

Briefly, the herein disclosed invention is expressly designed and uniquely adapted for use when the user is called upon to manually bend, loop and form an adjustable noose, loop or eye which, in turn, lends itself to use as a boat tying line, tent staking rope, tarpaulin holddown rope, lasso noose, clothesline or the like. The concept has to do with a rigid blocklike line binding clamp which has a pair of spaced parallel open-ended first and second holes through which component first and second loop-forming runs or side-by-side portions of the line are adapted to be threaded or passed. The clamp is also provided in a median portion at a precise locale between the first and second holes with an open-ended bore herein designated as a third hole. This third hole is disposed in a plane with its axis at right angles to the axes of the first and second holes and is adapted to receive a specially constructed pin, that is, a bodily insertable and removable pin. Diametrically opposite median portions of the third hole communicate with coacting median portions of the aforementioned first and second holes. The pin passes through and is retentively but turnably lodged in the third hole and has (1) a pair of diametrically opposite line clearing notches, and (2) intervening diametrically opposite camlike surfaces which are adapted to frictionally and clampingly bind themselves against cooperating surface portions of the line.

The pin proper is cylindrical in cross section and snugly fitted in the third hole. The pin is also provided at one end only with a conveniently available and actuatable handle which has a free end which is seatable for retention, when not in use, in a stationary keeper seat provided therefor in a terminal lug which is integral with an extension or shank, that is, a shank which projects from the central forward face of the blocklike body and has channeling grooves in its respective sides aligned with the aforementioned second and third holes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a line clamp constructed in accordance with the principles of the invention showing all of the component parts thereof, the rope or line being omitted and the handle of the aforementioned pin being illustrated in an unlatched position.

FIG. 2 is a top plan view of the line binding clamp of FIG. 1 with the line (rope or cable) in place and providing the loop or eye and showing the handle in its latched position.

FIG. 3 is a central longitudinal sectional view taken approximately on the plane of the section line 3—3 of FIG. 2 looking in the direction of the indicating arrows.

FIG. 4 is a horizontal section at right angles to FIG. 3 taken on the plane of the section line 4—4 of FIG. 3.

FIG. 5 is a cross section taken on the plane of the section line 5—5 of FIG. 3.

FIG. 6 is a detail section taken on the plane of the section line 6—6 of FIG. 3.

And FIG. 7 is a cross section taken through the blocklike body of the structure illustrated in FIG. 1, and showing the clearance notches of the pin lined up with the cooperable first and second line passing holes.

The solid blocklike body of the line holding loop forming clamp is denoted by the numeral 8, the shank by the numeral 10 and the manually actuatable handling means by the numeral 12. The line (rope, cord, cable or the like) is denoted by the numeral 14 and comprises first and second runs or component portions 16 and 18 having their connected ends formed into an adjustable nooselike eye or loop 19.

The solid blocklike body 8 is preferably but not necessarily rectangular in plan and has a planar top surface 20, a correspondingly flat parallel bottom surface 22 (FIG. 3), a forward surface 24, similar rearward surface 26 and end or side surfaces 28. The respective corners are preferably chamfered or beveled as at 30. The aforementioned first and second bores or channels have their ends opening through the forward and rearward surfaces 24 and 26 and are coplanar and in spaced parallel relationship and denoted by the numeral 32. The extension or shank 10 is of requisite length and cross section and has its rearward end joined to the central portion of the forward face 14 in coacting relationship with the first and second channels 32. The lengthwise surfaces of the shank, that is the surfaces 34, are provided with rope guiding and channeling grooves 36 which are open-ended and have their rearward ends lined up with the respective first and second channels 32. The top and bottom surfaces of the shank are flush with the top and bottom surfaces of the block or body and the top surface 38 is provided at its terminal end with an upstanding lug 40 which is recessed to provide a suitable shaped and proportioned keeper seat or shoulder 42. The first and second channels 32 serve to permit insertion and passage of the runs or component portions 16 and 18 of the aforementioned line 14. The shank 10 serves as a divider or separator and the grooves serve to guidingly channel the coacting portions 16 and 18 to facilitate the threading and looping steps.

The aforementioned third bore defines a hole denoted by the numeral 44 and this hole opens through the top and bottom surfaces of the block or body 8 and is of requisite cross-sectional dimension at diametrically opposite side portions thereof communicatively open into the respective first and second holes as brought out in both FIGS. 5 and 7 in particular. This hole is midway between the forward and rearward surfaces 24 and 26 of the body and is precision made to receive the binding pin 46. This pin has its bottom flush with the bottom surface of the block or body and has its upper end extending above the top surface 20 where it is convexly rounded to provide a head 48 which in turn is provided with a lateral handle 50 of requisite cross section and length. This handle is so connected and related to the head and pin that it regulates and designates the position of the equidistant circumferentially spaced peripheral surface portions of the pin proper, that is the two diametrically opposite clearance notches 52 and the circumferentially spaced equidistant convex camlike friction binding surfaces 54. Thus the clearance notches or indentations 52 and the camlike surfaces 54 can be selectively registered with the openings leading into the respective first and second passages or channels 32 by rotating the pin through the medium of the attached handle 50. It follows too that the clearance notches 52 when lined up with the first and second holes 28 permit free movement of the component portions or runs 16 and 18 of the cable or line 14 to allow a loop 19 of the desired size to be formed. Once the loop is shaped and sized to meet the conditions or requirements at hand, the portions 16 and 18 are clamped.

After the portions 16 and 18 have been properly lined up with the grooves 36 in the shank and threaded back and forth through the holes 32 and after the loop 19 has been thus set the handle 50 is switched or turned to bring the camlike surfaces 54 into play and to frictionally bind portions 16 and 18 as brought out in particular in FIG. 4. The end portion of the handle is provided with a shoulder portion which can be retentively seated in the keeper seat 42, as brought out in both FIGS. 2 and 3, and consequently the pin can be latched in its desired retaining position. Also, the user can be sure that the friction-retaining result has been achieved by noting whether the handle 50 is open or closed (open in FIG. 1 and closed in FIGS. 2 and 3).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A clamping device for use with a line such as is adapted for use as a boat mooring line, tent stabilizing line, tarpaulin tiedown line, clothesline, noose of a lasso or the like, the line having an end portion which is manually bendable upon itself to form an eyelike loop, said clamping device comprising a rigid clamp body having spaced substantially parallel open-ended first and second channels through and by way of which portions of a line can be threaded, and also having a median portion provided with an open-ended bore defining a hole, said hole being at substantially right angles to the plane defined by the axes of the first and second channels, a setting and binding pin passing snugly through and retentively and rotatably lodged in said hole for rotation between an open position and a closed position and having at least one indentation therein which aligns with one of said channels when said pin is in said open position, said indentation defining a camlike surface portion projecting into one of said first and second channels when said pin is in said closed position to frictionally and clampingly press against a cooperating peripheral surface of a coacting portion of line, a single-elongated handle attached at one end portion thereof to one end of said pin and extending away from said hole at substantially right angles thereto, the opposite end portion of said handle being provided with a shoulder portion, said clamp body including a longitudinally extending shank having shoulderlike locking means engaging said shoulder portion of the handle when said pin is in said closed position.

2. The combination defined in and according to claim 1, and wherein said hole is circular in cross section, is of uniform cross-sectional diameter from end to end, is situated approximately midway of and communicating with said first and second channels.

3. The combination defined in and according to claim 2, and wherein said setting and binding pin is rigid, is primarily cylindrical in cross section, is bodily insertable and removable into said clamp body.

4. The structure defined in and according to claim 1 wherein said pin is provided with a pair of indentations which define a pair of camlike surface portions which extend into said first and second channels respectively when said pin is in said closed position.

5. The structure defined in and according to claim 1 wherein said clamp device is of two-piece construction.

6. A clamping device comprising a rigid clamp body having a pair of spaced substantially parallel open-ended first and second channels, and also having a median portion which is situated between said first and second channels and is provided with an open-ended bore constituting a hole, said hole being at substantially right angles to the plane defined by the axes of said first and second channels and being adapted to receive a pin, opposite sides of a median portion of said hole having openings communicating with corresponding median portions of said first and second channels, and a rotary pin passing through and retentively and rotatably lodged in said hole for rotation between an open position and a closed position, said first and second channels opening through forward and rearward surfaces of said clamp body, said hole opening through top and bottom surfaces of said clamp body, said pin having a pair of indentations which align with said first and second channels respectively when said pin is in said open position, said indentations defining first and second camlike binding surfaces which are diametrically opposite each other and extend into said first and second channels respectively when said pin is in a said closed position for compressing and deforming a portion of line.

7. The combination defined in and according to claim 6, and wherein said indentations are diametrically opposite each other and are circumferentially spaced equidistant between said camlike binding surfaces.

8. The structure defined in and according to claim 6, and wherein said pin is provided at one end with a right angularly disposed handle, and shoulder means integral with said clamp body for locking said handle and pin in said closed position.

9. The structure defined in and according to claim 8, and wherein said shoulder means is provided on a longitudinally extending shank portion of said clamp body, said shoulder means including a recess in said shank portion providing a keeper-seat for the free latchable end of said handle.

10. The structure defined in and according to claim 6 wherein said pair of indentations are arcuate in shape and align with and conform in shape to said first and second channels respectively when said pin is in said open position.

* * * * *